United States Patent [19]

Ryham

[11] Patent Number: 5,683,550
[45] Date of Patent: Nov. 4, 1997

[54] METHOD AND APPARATUS FOR INCREASING RECOVERY BOILER CAPACITY BY WITHDRAWING COMBUSTIBLE GAS FROM THE FURNACE

[75] Inventor: Rolf C. Ryham, Suwanee, Ga.

[73] Assignee: Ahlstrom Recovery Inc., Alpharetta, Ga.

[21] Appl. No.: 595,467

[22] Filed: Feb. 5, 1996

[51] Int. Cl.$^6$ .............................. D21C 11/12; F23G 7/04
[52] U.S. Cl. .................. 162/30.1; 162/31; 48/197 R; 48/209; 110/203; 110/204; 110/238
[58] Field of Search .................. 162/29, 30.1, 30.11, 162/31; 110/203, 204, 238; 48/197 R, 209

[56] References Cited

U.S. PATENT DOCUMENTS

| | | | |
|---|---|---|---|
| 2,606,103 | 8/1952 | Hamm | 23/262 |
| 4,011,129 | 3/1977 | Tomlinson | 162/30 K |
| 4,135,968 | 1/1979 | Dehaas | 162/30 R |
| 4,739,729 | 4/1988 | Rettemeier et al. | 122/476 |
| 4,808,264 | 2/1989 | Kignell | 162/30.1 |
| 4,878,441 | 11/1989 | Ryham | 110/238 |
| 4,930,429 | 6/1990 | Ryham | 110/229 |
| 5,340,440 | 8/1994 | Henricson | 162/31 |

OTHER PUBLICATIONS

"A Comparison of Alternative Black Liquor Recovery Technologies", Grace and Timmer, 1995 International Chemical Recovery Conference, pp. B–269–B–275.

Primary Examiner—Donald E. Czaja
Assistant Examiner—Dean T. Nguyen
Attorney, Agent, or Firm—Nixon & Vanderhye P.C.

[57] ABSTRACT

A method and system for treating waste liquors from pulping processes for recovering energy and chemicals from the waste liquors (such as kraft black liquor). A recovery boiler having a furnace for combusting waste liquor includes a plurality of injection nozzles in the furnace walls, for injecting waste liquor into the furnace. At least one conduit is disposed in at least one wall of the furnace below the nozzles for withdrawing a portion of the combustible gas from the furnace. Typically between about 10–50% of the combustible gas produced in the furnace is withdrawn through the conduit or conduits below the nozzles, and the withdrawn gas is cooled and purified. The system may utilize a superheater which is separate and distinct from the recovery boiler, the cleaned and cooled withdrawn gas led to the separate superheater.

21 Claims, 3 Drawing Sheets

METHOD AND APPARATUS FOR INCREASING RECOVERY BOILER CAPACITY BY WITHDRAWING COMBUSTIBLE GAS FROM THE FURNACE

BACKGROUND AND SUMMARY OF THE INVENTION

The present invention relates to a method and apparatus for recovery of energy and chemicals from pulping process waste liquors (e.g. concentrated kraft black liquor). The invention especially relates to a method whereby the capacity of a recovery boiler, i.e. kraft recovery boiler, or the like is increased.

When combusting pulping process waste liquor, a primary purpose is to separate from each other the organic and the inorganic parts of the dry substance of the waste liquor. The heat from the organic part of the dry substance is recovered and the largest possible amount of steam is produced from the recovered heat. Pulping chemicals are recovered from the inorganic part of the dry substance in such a form that they can, in the subsequent stages of processing, be converted into a suitable form (e.g. green or white liquor) to be reused in the cooking process.

In the past, the conventional recovery boiler has proven to be superior for the recovery of heat and chemicals from waste liquors. The recovery boiler, prior to its main heat absorbing sections, can be considered as including three distinct zones: (1) a reduction zone at the bottom of the boiler; (2) a drying and pyrolysis zone, where liquor drops dry and are pyrolyzed when falling into the reduction zone; and (3) an oxidation zone in the upper section. The waste liquor is sprayed through liquor nozzles in the form of small drops into a furnace of the boiler. To ensure complete combustion, combustion air is also introduced into the recovery boiler. Air is usually introduced at three different levels: primary air at a lower part of the furnace, secondary air above the primary air level but below the liquor nozzles, and tertiary air above the liquor nozzles. These three air levels are conventional basic air levels in a modern recovery boiler, but other or additional air levels may be provided in the recovery boiler.

In the hot combustion chamber of the recovery boiler water vapor, volatile parts of the dry substance, and eventually gasifiable parts of the dry substance, evaporate from the liquor drops. The gases burn, thereby delivering heat to heat transfer surfaces, a superheater, and a boiler bank, disposed in the boiler, and the waste gases from combustion are discharged from the upper end of the boiler. The ash from the waste liquor drop to the bottom of the boiler (i.e. the inorganic substances of the waste liquor accumulate on the bottom of the boiler), from which they are removed and through various stages of processing conveyed back to the cooking process (e.g. green liquor, and then white liquor, produced therefrom).

The flue gases from the recovery boiler contain a large amount of ash, mainly sodium sulphate, a portion of which flows along with the flue gases upwardly in the boiler in the form of fine dust or molten drops. The salts ($Na_2SO_4$, $Na_2CO_3$, $NaCl$) contained in the ash melt at a relatively low temperature and become, when molten or just before they become molten, adhesive and corrosive. The deposits formed by the molten ash cause the risk of clogging of the flue gas channels and, furthermore, cause corrosion and erosion of the heat transfer surfaces of the boiler. The risk of clogging and corrosion increases considerably the number of shutdowns required for washing, inspection, and/or maintenance.

A high temperature of the boiler tubes accelerates the formation of deposits and thereby the corrosion risk of the heat transfer surfaces. Therefore these deposits particularly adversely affect the heat transfer surfaces of the superheater. Usually, corrosion is reduced by controlling the temperature of the superheater surfaces.

The principal way of avoiding corrosion is, at least at the present, to choose a sufficiently low temperature and pressure for the stream produced by the boiler so that the detrimental effects of the molten salts decrease. This means that the steam cannot be superheated to as high a temperature as desired for the efficient production of electric power in steam turbine plants.

Attempts have been made to reduce fouling of surfaces and clogging of flue gas channels by increasing the dimensions of the convection section, and increasing the distance between the superheater surfaces. Larger clearances facilitate cleaning of the surfaces. These arrangements increase, however, the size of the boiler and thus often have unfavorably high construction costs.

A recovery boiler in which the size of the superheater has been increased is inferior in heat transfer and vaporization efficiency to a corresponding conventional coal-fired boiler. The tendency of the superheater surfaces to foul multiplies the area of the heat transfer surfaces needed in comparison with a coal-fired boiler, the flue gases of which contain only small amounts of ash, or no ash at all.

The reactions in the furnace of the recovery boiler are usually not disturbed by the amount of the black liquor to be treated. Consequently, the capacity of the recovery boiler is primarily restricted by the fouling of the heat transfer surfaces located in the upper end of the boiler. A new recovery boiler may be required, if an essential increase in the amount of the black liquor to be treated in the recovery boiler is desired, because the introduction of additional heat transfer surface area in an existing recovery boiler is restricted from a technical and economical standpoint. However, the installation of a new boiler is an expensive solution, often not cost effective.

It has been suggested that the recovery capacity of a pulp mill may be increased by installing a "recovery booster" without necessitating the construction of a new recovery boiler. A recovery booster is a gasification or combustion unit installed outside of the recovery boiler. The idea is to bypass a portion of black liquor to the recovery booster and thus reduce the load in the recovery boiler. A conventional recovery booster of the gasification type operates on the principle of gasifying the black liquor at substoichiometric conditions (about 0.3× stoichiometric) resulting in a flue gas having a temperature of about 800°–900° C. The flue gas is quenched with water and reduced sulphurous components are scrubbed from the cooled gas by using a weak caustic solution. The cleaned gas is then combusted in a separate gas boiler. While this solution may be technically satisfactory, it requires rather high initial capital investment. Additionally, the installation of this booster in an old pulp mill may be problematic because of lack of space.

According to the present invention a method of increasing the production capacity of a recovery boiler, even of an existing one, for waste liquor is provided that is technically simple and practical, and more economical than previous methods. The capacity of the recovery boiler is improved in such a way that the energy generated in the combustion of waste liquor can be recovered and used in the best possible way.

According to one aspect of the present invention a method of treating waste liquors from pulping processes for recovering energy and chemicals from the waste liquors (such as black liquor from kraft pulping) is provided. The method comprises the following steps: (a) Injecting pulping process waste liquor into the furnace of the recovery boiler at a first level and combusting the waste liquor to generate combustible gas. (b) Dividing the combustible gas into at least first and second streams. (c) Combusting the gas in the first stream in the oxidizing zone of the recovery boiler to generate a flue gas, and discharging the flue gas from the boiler. And, (d) withdrawing the second combustible gas stream from the furnace at one or more points below the oxidation zone, and cooling and purifying the second combustible gas to produce a cleaned second combustible gas.

Step (d) is typically practiced by withdrawing the second combustible gas stream from below the first level. The recovery boiler typically has primary and secondary air levels below the first level, and step (d) is also typically practiced to withdraw the second combustible gas from between the primary and secondary air levels. Steps (a) through (d) are typically practiced so that between about 10–50% of the combustible gas produced in step (a) is produced as cleaned second combustible gas in step (d).

The cooling of the gas in step (d) may be effected by direct cooling, or indirect cooling. Typically there is the further step (e) of using the cleaned second combustible gas from step (d) as fuel in a pulp mill (from which the pulping process waste liquor is obtained). There may also be the further steps of: (f) Using the flue gas generated in step (c) to produce saturated or partially saturated superheated steam in the recovery boiler. (g) Combusting the cleaned second gas from step (d) in a superheating boiler. And, (h) superheating the steam produced in the recovery boiler in step (f) in the superheating boiler. There may also be the further step of using the second cleaned combustible gas from step (d) as fuel in a separate gas boiler, in a bark boiler, or in a lime reburning process.

According to another aspect of the present invention a system for recovering energy and chemicals from a waste liquor of a pulping process is provided. The system comprises the following components: A recovery boiler having a furnace for combusting the waste liquor to produce combustible gas, the furnace having walls. A plurality of nozzles in the furnace walls for injection of the waste liquor into the furnace. And, at least one conduit disposed in at least one wall of the furnace and below the liquor nozzles for withdrawing a portion of the combustible gas from the furnace.

The furnace typically has primary and secondary air levels, and the at least one conduit is located between the primary and secondary air levels. The at least one conduit is typically connected to a means for cooling and cleaning the combustible gas withdrawn from the furnace through the at least one conduit, to produce a cleaned gas. The gas cooling and cleaning means is preferably connected to a combusting means for using the cleaned gas as fuel.

According to the present invention the furnace of the existing recovery boiler is used as a gasifier to produce combustible gas from the waste liquor. A portion of the produced gas stream is discharged from the furnace and thus the total amount of the gas stream is reduced. The method may lend itself to any recovery boiler configuration. Gas is removed at a single point or at many different points. The different points may be located at the same horizontal level in one or more walls of the furnace or at different vertical levels. If a high volume of gas is removed, the removal preferably takes place at two or more points.

As mentioned above, when the capacity of the boiler, i.e. the amount of black liquor to be treated, has to be increased, the bottleneck in a recovery boiler is usually the superheater/boiler bank section, and not usually the furnace. By practicing the present invention, the capacity of an existing recovery boiler may be increased in a very simple way by leading part of the generated gas stream outside the recovery boiler so that it does not have to flow to the upper furnace and the superheater/boiler bank section. It may be estimated that at least 10–50% (e.g. between about 20–40%) of the produced gas may be exhausted from the recovery boiler, and thus the capacity of the boiler is increased an equal amount.

According to another aspect of the present invention a method is provided for increasing the capacity of an existing recovery boiler, having a furnace and oxidating zone, for acting on a waste liquor from a pulping process from which liquor energy and chemicals are recovered. The conventional recovery boiler includes a plurality of nozzles in furnace walls for injecting waste liquor into the furnace. The method comprises the steps of: (a) Introducing at least one conduit into at least one wall of the furnace below the liquor nozzles and the oxidation zone. (b) Injecting waste liquor from a pulping process into the furnace using the nozzles, and combusting the waste liquor to generate combustible gas. And, (c) withdrawing some, but not all, of the combustible gas from the furnace through the at least one conduit introduced in the practice of step (a).

Typically step (c) is practiced to withdraw between about 10–50% (e.g. between about 20–40%) of the combustible gas produced in step (b) through the one or more conduits that were introduced in step (a). There is also preferably the further step (d) of cooling and purifying the gas withdrawn in step (c) to produce a cleaned combustible gas, which is then used as combustion gas in a separate gas boiler, bark boiler, or lime reburning process.

The furnace of the recovery boiler may be considered a gasifier, since the combustion is staged with the air being added typically at three levels. The first level, primary level, closest to the char bed at the bottom of the furnace receives about 20–30% of the total air flow. This situation resembles the concept of 0.3× stoichiometric gasifier described above. The secondary air supply is typically 60–80% of the total air supply. Finally, at the tertiary air level the amount is 1.05× stoichiometric. The dimensioning gas flow in the furnace is, in other words, the gas flow after the tertiary level. Consequently, if a gas flow is extracted approximately between the primary and the secondary air levels, a gas coming from a 0.3× stoichiometric condition will be obtained. The gas withdrawn from the furnace contains a large volume of impurities, such as particulates, and sulphur and other substances, such as alkali salts. The gas should be cleaned so that it can be utilized at a pulp mill.

It is also desirable or necessary to cool the removed gas to a temperature allowing removal of sulphur and alkali compounds contained in the gas. In principle the gas may be cooled by the use of indirect or direct cooling. Combustion air might be used as a cooling medium for indirect cooling. However, the use of indirect cooling may occasion problems. The alkali salts, such as sodium and potassium salts, contained in the gas easily become adhesive and corrosive. The deposits formed by the molten salts during the cooling cause the risk of clogging of the heat exchanger. This means that a soot blowing apparatus or the like would be necessary to keep the heat surfaces clean.

Preferably, the gas is at first cooled directly. There are different ways for direct cooling. The hot gas exhausted from the furnace is mixed with a cooled product gas. This may be accomplished in such a way that part of the already cooled gas is recycled back toward and mixed with hot gas in order to decrease the temperature below the salt condensation point. The temperature of the gas mixture may be further decreased e.g. in an air preheater or water heater. Optionally, the gas from the lower furnace is cooled in a circulating bed reactor. The gas withdrawn from the furnace is brought into contact, prior to a heat exchanger, with solid particles which are separated from the cooled gas after the treatment and recirculated back to the reactor. The gas may be cooled below the solidification temperature so that the alkali salts contained in the gas do not stick on the heat transfer surfaces of the heat exchanger.

It is also possible to bring the hot gas into direct contact with a cooled solid dynamic heat carrier, which is thereafter used for heating steam, air or other gases, as described in U.S. Pat. Nos. 4,878,441 and 4,930,429. One alternative is also evaporative cooling, in which black liquor, green liquor or a corresponding liquid in a pulp mill may be used as a cooling medium. The hot gas and cooling liquid are brought into contact in a mixing device, such as a venturi.

The directly cooled gas may further be cooled, if required, either directly or indirectly. The indirect cooling may now be applied, since the gas is typically below the temperature where the entrained alkali salts changes from a molten state to a solid state.

The cooled gas is then cleaned to remove undesirable components, e.g. sulphur and alkali compounds. Preferably this is performed by adsorption or absorption e.g. by scrubbing with alkaline solution, such as white liquor or with selective solvent, if required. The removed sulphur compounds may utilized within the pulp mill, e.g. to increase the sulphidity of white liquor. It is known that a higher sulfide concentration in white liquor for kraft pulping could produce kraft pulp with higher viscosity and better physical properties.

The cooled and cleaned gas can now be used as a fuel in a number of different places in a pulp mill, e.g. in a separate gas boiler, in a bark boiler, or in a lime reburning process.

There are still other advantageous manners for utilizing the cleaned gas obtained by practicing the invention. As described above, a problematic section of the recovery boiler is the superheater because of the fouling the heat surfaces thereof. By means of the present invention it is possible to combust the cleaned gas in a separate burner outside the recovery boiler and then to return the gas into the recovery boiler behind the superheater section and even behind the boiler bank. Since the gas is cooled and cleaned, it is possible to ease the load of the superheater and also to moderate the superheater inlet gas temperature.

By practicing the present invention it is also possible to replace the superheater of the recovery boiler with a separate superheating boiler, and this steam is superheated in a separate superheater by burning the above described gas, which has been cleaned of impurities causing problems at higher temperatures in the recovery boiler. A separate superheating is known per se. The improvement is that the fuel (combustible gas) is produced in the recovery boiler as in the conventional recovery boiler, but it is now possible to produce superheated steam without harmful effects caused by the impurities contained in the flue gases from the recovery boiler.

The recovery boiler thus functions, according to the invention, principally as a vaporizing boiler, in which at most only partial superheating is effected. In the vaporizing boiler, the surface temperature of the materials does not rise as high as in the superheating section, so that the risk of corrosion is smaller. The superheater possibly disposed in the recovery boiler will be small compared with a traditional boiler, as the main part of the superheating is effected in a separate boiler in a considerably hotter environment. The heat surfaces of the superheating boiler are more efficiently used than in a traditional recovery boiler, which means that a smaller amount of tubes are needed in a smaller boiler, in other words a saving of capital costs is achieved.

The flue gases from the separate superheating boiler can be conducted into the flue gases from the recovery boiler at some suitable point, in which their heat content is recovered more efficiently. Their heat can be recovered for instance in the preheating of air as in conventional power plant boilers. In a traditional recovery boiler, the flue gases are too impure to be conducted to the air preheater.

It is the primary object of the present invention to provide for efficient treatment of waste liquor from a pulping process in a recovery boiler. This and other objects of the invention will become clear from an inspection of the detailed description of the invention and from the appended claims.

DETAILED DESCRIPTION OF THE DRAWINGS

Figure 1:
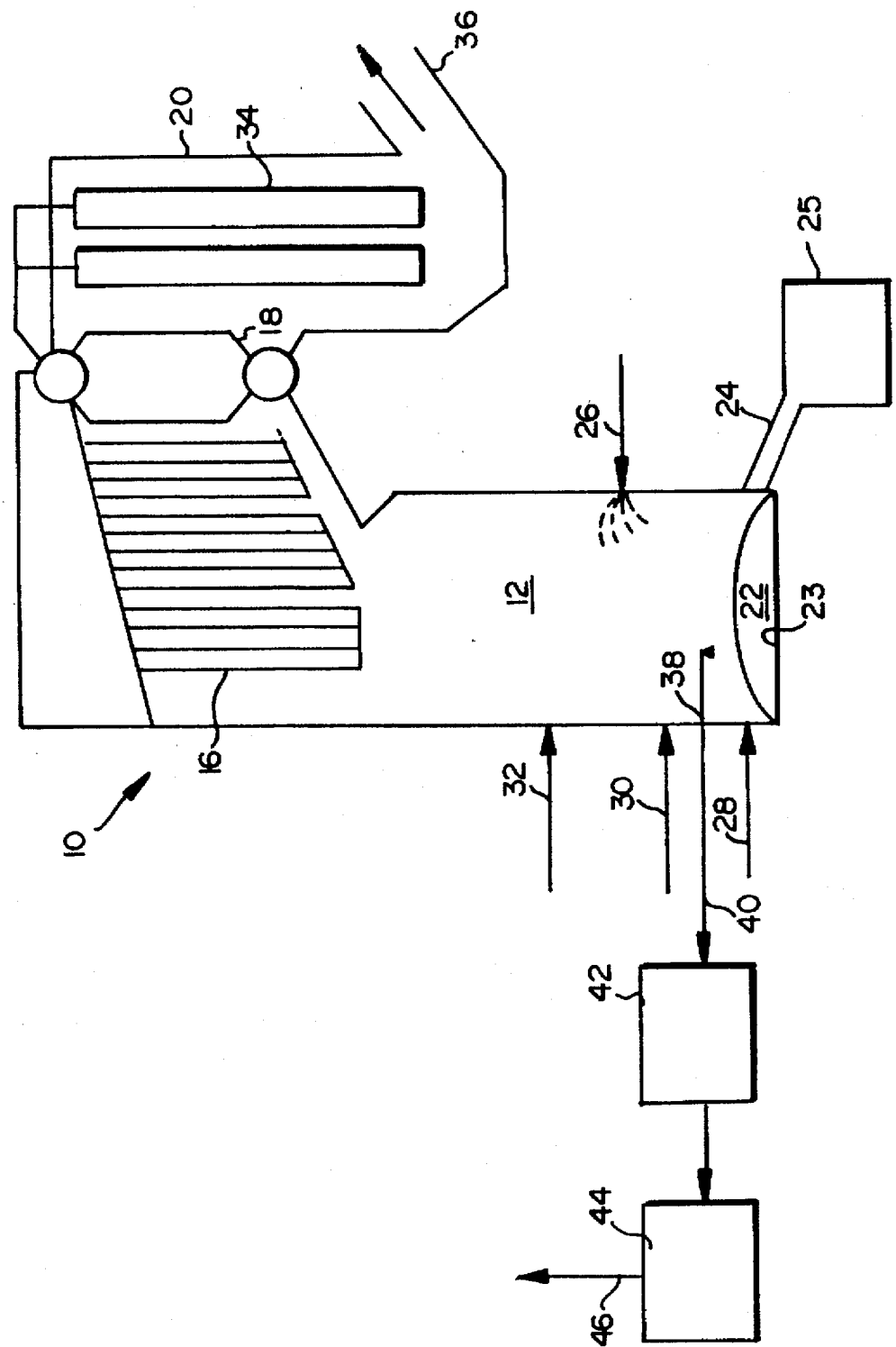
FIG. 1 is a schematic view of an exemplary system according to the invention for exhausting flue gas from a recovery boiler and treating the gas.

A conventional recovery boiler 10 in accordance with FIG. 1 comprises a furnace 12 and heat exchange surfaces located downstream of the furnace including a superheater 16, a boiler bank 18 and an economizer 20. In the combustion process, a char bed 22 of dried and partly combusted black liquor (or other pulping process waste liquor) is formed at the bottom of the recovery boiler 10, on furnace floor 23. Molten chemicals flow through the porous char bed to the bottom, from where they are transferred via melt spouts 24 to a dissolving tank 25. Black liquor is introduced into the boiler by spraying through nozzles 26.

Combustion air is introduced into boiler 10 from three different levels: primary air 28, secondary air 30, and tertiary air 32. The primary and the secondary air levels 28, 30 are located below the liquor injecting nozzles 26 and the tertiary air level 32 above the liquor injecting nozzles 26 to ensure complete combustion. The primary air level 28 is usually situated about 1 meter above the furnace floor 23 and the secondary level 30 between about 1.5–4 m above the floor 23. The liquor nozzles 26 are positioned between about 3–7.5 m above the floor 23. The tertiary air level 32 is located between about 1.5–5 m above the liquor nozzles 26. There may be other air feed levels instead of, or in addition to, those mentioned above.

In the recovery boiler 10 heat is recovered from flue gases by the vaporizing surfaces 18 (boiler bank), a water preheater 34 (economizer), and the superheating surfaces 16. The flue gas that flows through the upper part of the boiler 10 is discharged from the boiler 10 through a conduit 36.

According to the invention, part of the gas formed in the furnace 12 of the recovery boiler 10 is exhausted from the furnace 12 at a point or points where it is still combustible and alkali salts contained therein are in a molten state. Preferably this point (at 38 in FIG. 1) is situated where reducing conditions predominate. The zone adjacent point 38 is preferably located below the liquor nozzles 36, between the primary and secondary air levels 28, 30. Accordingly, the amount of the black liquor to be fed to the recovery boiler 10 (i.e. the capacity of the recovery boiler) can be increased, since part of the generated gas bypasses the upper end of the boiler 10.

The exhausted hot gas (about 900°–950° C.) at point 38 passes into a line 40, and then to a cooling unit 42, where it is cooled for cleaning. The cooled gas is led to a cleaning unit 44 where it is cleaned e.g. by scrubbing. The cooling and cleaning means 42, 44 may utilize any conventional direct cooling structure as the cooling unit 42, or any conventional indirect cooling structure (such as heat exchangers) for the cooling unit 42. Alternatively, the cooling means 42 may provide indirect and direct cooling in parallel or series stages. Various cooling means will be described with respect to FIG. 3.

The cleaning or purifying unit 44 may comprise a conventional scrubber, screen, or filter of any type, or combinations thereof. Also cleaning may be accomplished utilizing catalytic activity, ion exchange columns, or other conventional mechanisms as the cleaning/purifying means 44.

The cleaned combustible gas from cooling and cleaning means 42, 44 is passed through a line 46 to an end user. The gas may be used as a fuel anywhere within the pulp mill.

Figure 2:
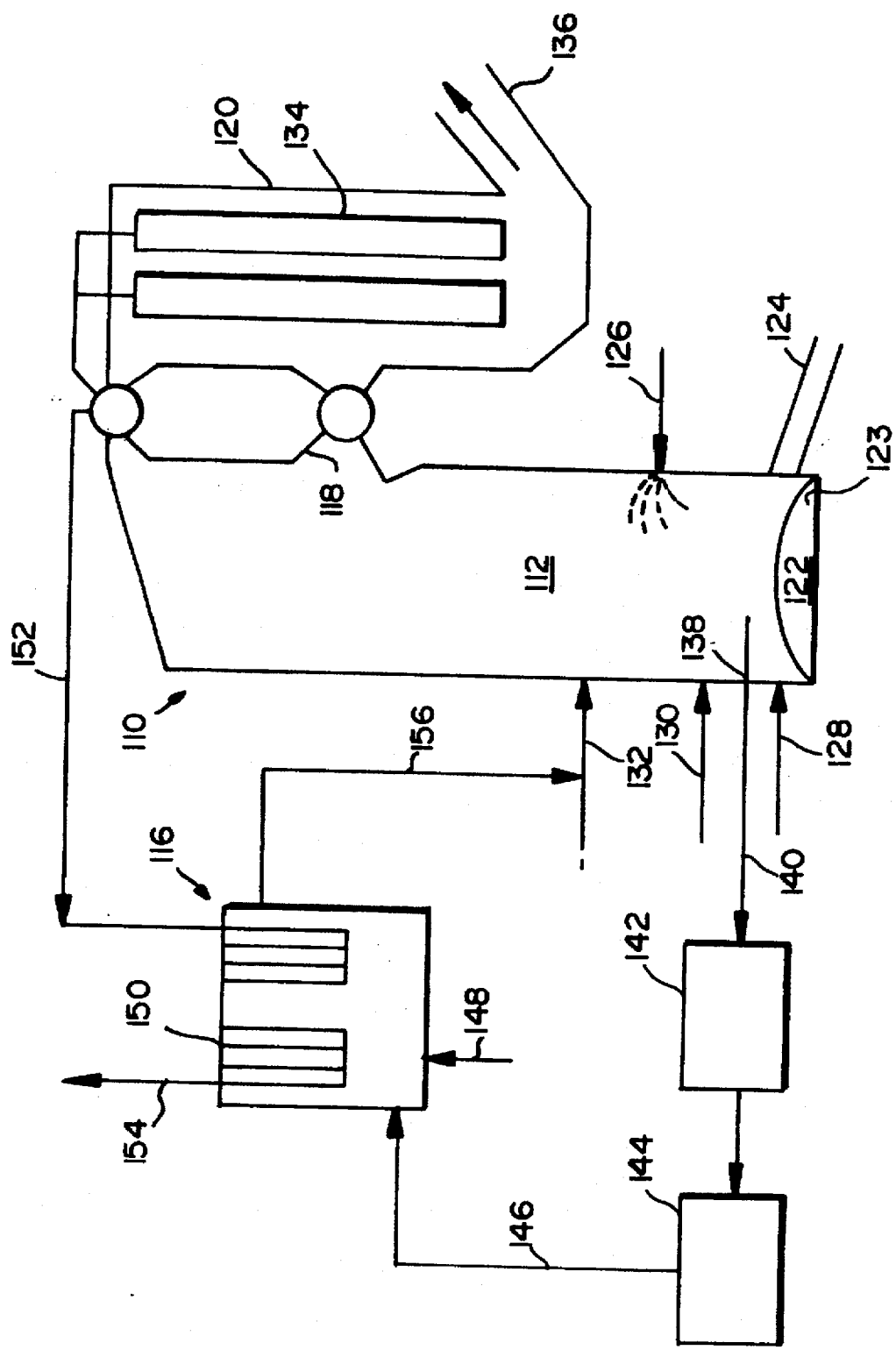
FIG. 2 is a schematic view of another exemplary system according to the invention.

FIG. 2 shows a system according to the invention including a means for utilizing the cleaned gas from line 46. In the FIG. 2 embodiment components similar or identical to those in the FIG. 1 embodiment are shown by the same reference numeral only preceded by a "1".

In the FIG. 2 embodiment, there is a separate superheating boiler 116, where the gas is combusted. The recovery boiler 110 comprises the same pads as the boiler 10 according to FIG. 1 does, but the superheater section (16) is completely or at least partly omitted. Heat is recovered by means of vaporizing surfaces 118 and a water preheater 134.

Part of the gas produced in the recovery boiler 110 flows through the upper end of the boiler 110 and is discharged from the boiler 110 through a line 140, cooled in a unit 142 and cleaned in a gas purification unit 144. The cleaned gas is led through a line 146 to the separate superheating boiler 116, where combustion air is supplied through a line 148. Superheating surfaces 150 are disposed in the superheating boiler 116 for superheating the steam coming from the recovery boiler 110 through steam lines 152. Steam at a pressure of between about 100–200 bar (e.g. between about 150–175 bar) and a temperature between about 400°–650° C. may be produced. The superheated steam is led through a line 154 e.g. to a conventional steam turbine plant (not shown).

The flue gases formed in the superheating boiler 116 are passed directly to the upper part of the recovery boiler 110 or through a line 156 to the lower part of the recovery boiler 110 together with combustion air 132. Flue gases may also be used for heating combustion air.

Figure 3A:
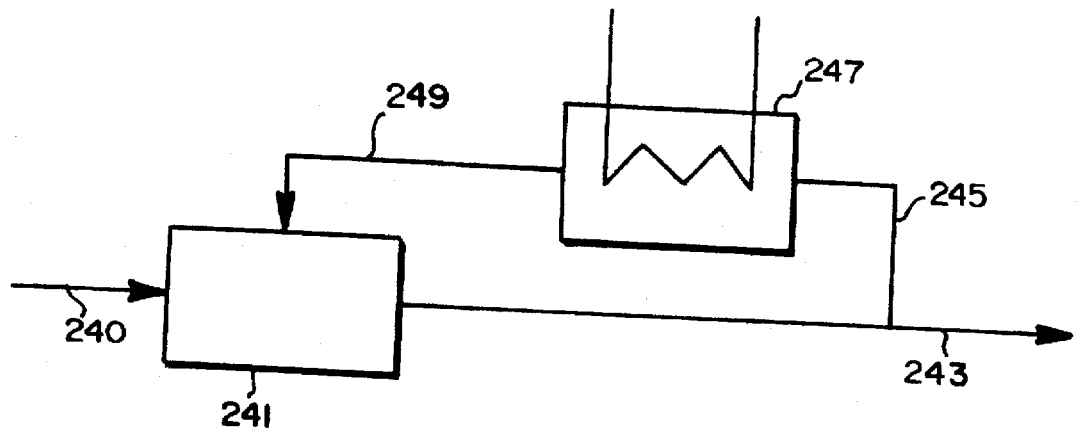
FIG. 3 is a schematic view of an exemplary system according to the invention for cooling the gas exhausted from a recovery boiler.
Figure 3B:
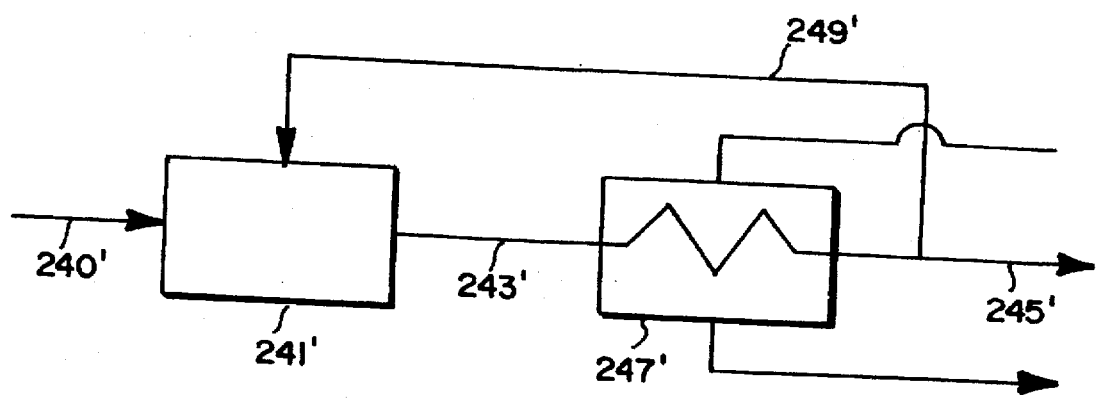

FIGS. 3a and 3b show exemplary systems (cooling means) for cooling a gas exhausted from the recovery boiler (e.g. comparable to structures 42, 142). In the arrangement of FIG. 3a gas at between about 800°–1000° C. is introduced via a line 240 to a gas mixer 241, in which the hot gas is mixed with cooled gas from a line 249. The gas mixture, having a temperature of lower than about 700° C., is fed through a line 245 to an apparatus 247 for further cooling or through a line 243 to further treatment. The apparatus 247 may be e.g. an air preheater or a water heater. The gas mixture from the apparatus 247 has a temperature of between about 200°–500° C. and is returned to the gas mixer 241 as the cooling gas.

In the embodiment of FIG. 3b gas at a temperature between about 800°–1000° C. is introduced via a line 240' to a gas mixer 241', in which the hot gas is mixed with cooled gas from a line 249'. The gas mixture having a temperature of lower than about 700° C. is fed through a line 243' to an apparatus 247' for further cooling. The apparatus 247' is a low pressure boiler arrangement where saturated steam (at a pressure of between about 10–80 bar, e.g. between about 30–60 bar) is used as the heating medium. The gas mixture from the apparatus 247' has now a temperature of between about 200°–500° C. and is returned to the gas mixer 241' as the cooling gas. The balance of the gas is introduced to a gas cleaning unit (e.g. 44, 144).

In the system according to the present invention combustible gas from the lower furnace 12 of a recovery boiler 10 may be discharged through one or more points (e.g. 38 in FIG. 1), which are at the same level in the boiler wall. Alternatively, discharge points may be located at different vertical levels.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of treating waste liquors from pulping processes for recovering energy and chemicals from the waste liquors, utilizing a a recovery boiler having a furnace and an oxidizing zone, comprising the steps of:

(a) injecting pulping process waste liquor into the furnace of the recovery boiler at a first level and combusting the waste liquor to generate combustible gas;

(b) dividing the combustible gas into at least first and second streams;

(c) combusting the gas in the first stream in the oxidizing zone of the recovery boiler to generate a flue gas, and discharging the flue gas is from the boiler; and (d) withdrawing the second combustible gas stream from the furnace at one or more points below the oxidation zone, and cooling and purifying the second combustible gas to produce a cleaned second combustible gas.

2. A method as recited in claim 1 wherein step (d) is practiced by withdrawing the second combustible gas stream from below the first level.

3. A method as recited in claim 1 wherein the recovery boiler has primary and secondary air levels below the first level, and wherein step (d) is practiced to withdraw the second combustible gas from between the primary and secondary air levels.

4. A method as recited in claim 1 wherein steps (a)–(d) are practiced so that between about 10–50% of the combustible gas produced in step (a) is produced as cleaned second combustible gas in step (d).

5. A method as recited in claim 1 wherein the cooling of the gas in step (d) is effected by direct cooling, then indirect cooling.

6. A method as recited in claim 1 wherein the cooling of the gas in step (d) is effected by indirect cooling.

7. A method as recited in claim 1 comprising the further step (e) of using the cleaned second combustible gas from step (d) as fuel in a pulp mill.

8. A method as recited in claim 7 comprising the further steps of: (f) using the flue gas generated in step (c) to produce saturated or partially saturated superheated steam in the recovery boiler; (g) combusting the cleaned second gas from step (d) in a superheating boiler; and (h) superheating the steam produced in the recovery boiler in step (f) in the superheating boiler.

9. A method as recited in claim 7 comprising the further step of using the second cleaned combustible gas from step (d) as fuel in a separate gas boiler.

10. A method as recited in claim 7 comprising the further step of using the second cleaned combustible gas from step (d) as fuel in a bark boiler.

11. A method as recited in claim 7 comprising the further step of using the second cleaned combustible gas from step (d) as fuel in a lime reburning process.

12. A method as recited in claim 1 wherein step (a) is practiced utilizing concentrated black liquor from kraft pulping as the waste liquor.

13. A method as recited in claim 1, wherein the cooling of the gas in step (d) is effected by direct cooling.

14. A method of increasing the capacity of a recovery boiler, having a furnace with an oxidizing zone and furnace walls, with injection nozzles mounted in the furnace walls for injecting pulping process waste liquor into the furnace, said method comprising the steps of:

(a) introducing at least one conduit into at least one wall of the furnace of the existing recovery boiler below the liquor nozzles and the oxidation zone;

(b) injecting waste liquor from a pulping process into the furnace using the nozzles, and combusting the waste liquor to generate combustible gas; and (c) withdrawing some, but not all, of the combustible gas from the furnace through the at least one conduit introduced in the practice of step (a).

15. A method as recited in claim 14 wherein step (c) is practiced to withdraw between about 10–50% of the combustible gas produced in step (b) through the one or more conduits added in step (a).

16. A method as recited in claim 15 comprising the further steps of cooling and purifying the gas withdrawn in step (c) to produce a clean combustible gas.

17. A method as recited in claim 16 wherein the cooling step is effected by both direct cooling and indirect cooling, and wherein the purifying step is practiced by scrubbing, absorption, adsorption, screening, or filtering.

18. A system for recovering energy and chemicals from a waste liquor of a pulping process, comprising:

a recovery boiler having a furnace for combusting the waste liquor to produce combustible gas, the furnace having walls;

a plurality of nozzles in the furnace walls for injection of the waste liquor into the furnace; and at least one conduit disposed in at least one wall of said furnace and below said liquor nozzles for withdrawing a portion of the combustible gas from the furnace.

19. A system as recited in claim 18 wherein the furnace has primary and second air levels, and wherein said at least one conduit is located between said primary and secondary air levels.

20. A system as recited in claim 18 wherein said at least one conduit is connected to means for cooling and cleaning the combustible gas withdrawn from the furnace through said at least one conduit, to produce a cleaned gas.

21. A system as recited in claim 20 wherein said gas cooling and cleaning means is connected to a combusting means for using the cleaned gas as fuel.

* * * * *